(12) United States Patent
Moeller (10) Patent No.: US 6,750,956 B2
(45) Date of Patent: Jun. 15, 2004

(54) METHOD AND APPARATUS FOR ON-LINE MONITORING OF POLARIZATION MODE DISPERSION IN A TRANSMISSION SYSTEM

(75) Inventor: Lothar Benedict Moeller, Hazlet, NJ (US)

(73) Assignee: Lucent Technologies Inc., Murray Hill, NJ (US)

(*) Notice: Subject to any disclaimer, the term of this patent is extended or adjusted under 35 U.S.C. 154(b) by 42 days.

(21) Appl. No.: 09/518,296

(22) Filed: Mar. 3, 2000

(65) Prior Publication Data

US 2002/0093643 A1 Jul. 18, 2002

(51) Int. Cl.[7] ............................................. G01N 21/00
(52) U.S. Cl. ............................................ 356/73.1
(58) Field of Search ................... 356/73.1, 364–367; 250/225, 227.17; 398/9–38, 45–47; 385/11, 16; 359/110, 122, 156, 161, 177

(56) References Cited

U.S. PATENT DOCUMENTS

| | | | | |
|---|---|---|---|---|
| 4,752,120 A | | 6/1988 | Shimizu | 350/388 |
| 5,859,939 A | * | 1/1999 | Fee et al. | 359/140 |
| 5,949,560 A | * | 9/1999 | Roberts et al. | 359/110 |
| 2002/0036811 A1 | * | 3/2002 | Robinson et al. | 359/110 |

FOREIGN PATENT DOCUMENTS

EP 0553460 A2 * 8/1993

* cited by examiner

Primary Examiner—Tu T. Nguyen (57) ABSTRACT

A method and apparatus for measuring polarization mode dispersion in a transmission system. The method allows polarization mode dispersion to be measured concurrent with data transmission in the transmission system.

17 Claims, 5 Drawing Sheets

FIG. 5

METHOD AND APPARATUS FOR ON-LINE MONITORING OF POLARIZATION MODE DISPERSION IN A TRANSMISSION SYSTEM

TECHNICAL FIELD

The invention relates to a method and apparatus for transmission line monitoring and, more particularly, to a method and apparatus of monitoring polarization mode dispersion in a fiber optic cable.

BACKGROUND OF THE INVENTION

A typical transmission fiber used for fiber-optic communication exhibits cylindrical asymmetry with respect to its core due to imperfections in the manufacturing process. This asymmetry results in a fiber birefringence which causes one polarization component of an optical signal to travel at a different group velocity compared to the other (orthogonal) polarization component. Thus, a signal pulse propagating through the fiber exhibits pulse broadening due to the effect of polarization mode dispersion (PMD). Typically, the PMD, which is wavelength-dependent, may also be affected by environmental factors such as vibration or temperature changes, which result in changes in the stress or torsion of the fiber.

If there is only a first order PMD in the fiber, a single pulse propagating through the fiber will appear as two separate pulses at the output of the fiber. The time delay between the two output pulses is called the differential group delay (DGD). In general, however, there are higher orders of PMD, resulting in an output comprising many pulses along both polarization axes. These overlapping pulses arising from PMD, along with other effects such as chromatic dispersion, will lead to pulse broadening. In a transmission system, chromatic dispersion and other effects are usually corrected for by well-known techniques. However, signal pulses broadened by polarization mode dispersions, if left uncorrected, may still result in severe distortion or loss of data.

Thus, a PMD compensator is typically used in a transmission line to compensate for the PMD in the fiber, to ensure that signal pulses arriving at the receiver are properly reshaped. Since the PMD of the transmission line varies with time (e.g., due to external disturbances such as vibrations or temperature variations causing changes in the stress and torsion of the fiber) and wavelength, it is also necessary to monitor PMD in real-time in order to properly control the PMD compensator.

One problem with existing PMD measurement techniques is that an interruption of data transmission is required for PMD measurements, because an external signal source is typically used for monitoring purposes.

SUMMARY OF THE INVENTION

Embodiments of the present invention provide a method and apparatus for monitoring polarization mode dispersion (PMD) in a transmission fiber concurrent with data transmission through the fiber.

The PMD of the transmission fiber is measured by using a PMD monitor comprising a polarization switch, an optical bandpass filter, and a polarimeter. The polarization switch is connected to an input of the transmission fiber, while the optical bandpass filter is connected to the output of the transmission fiber.

At the output of the transmission fiber, a fraction of the data signal is directed to the optical bandpass filter, which allows a selected frequency range of the data signal to enter the polarimeter.

Using the polarimeter, measurements are performed to obtain parameters related to polarized signal components by scanning the optical bandpass filter through the spectrum of the data signal. These measurements are performed with the data signal set at two or more different polarization states that are non-orthogonal to each other, prior to propagating the data signal through the transmission fiber. The polarization mode dispersion in the fiber can be determined from an analysis of these parameters.

BRIEF DESCRIPTION OF THE DRAWINGS

The teachings of the present invention can readily be understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The present invention provides a method and apparatus for determining polarization mode dispersion (PMD) in a transmission fiber. In particular, the method allows on-line PMD determination in a transmission system concurrent with data transmission, i.e., without interrupting data transmission such that an information bearing data signal may be utilized by the invention to determine PMD in the transmission fiber without destroying the underlying information. The PMD in the transmission fiber is determined using a PMD monitor by measuring polarization parameters of selected spectral components of the data signal. In one embodiment, a Jones matrix analysis is used to determine the PMD in the transmission fiber.

System Architecture for On-Line PMD Monitor

Figure 1:
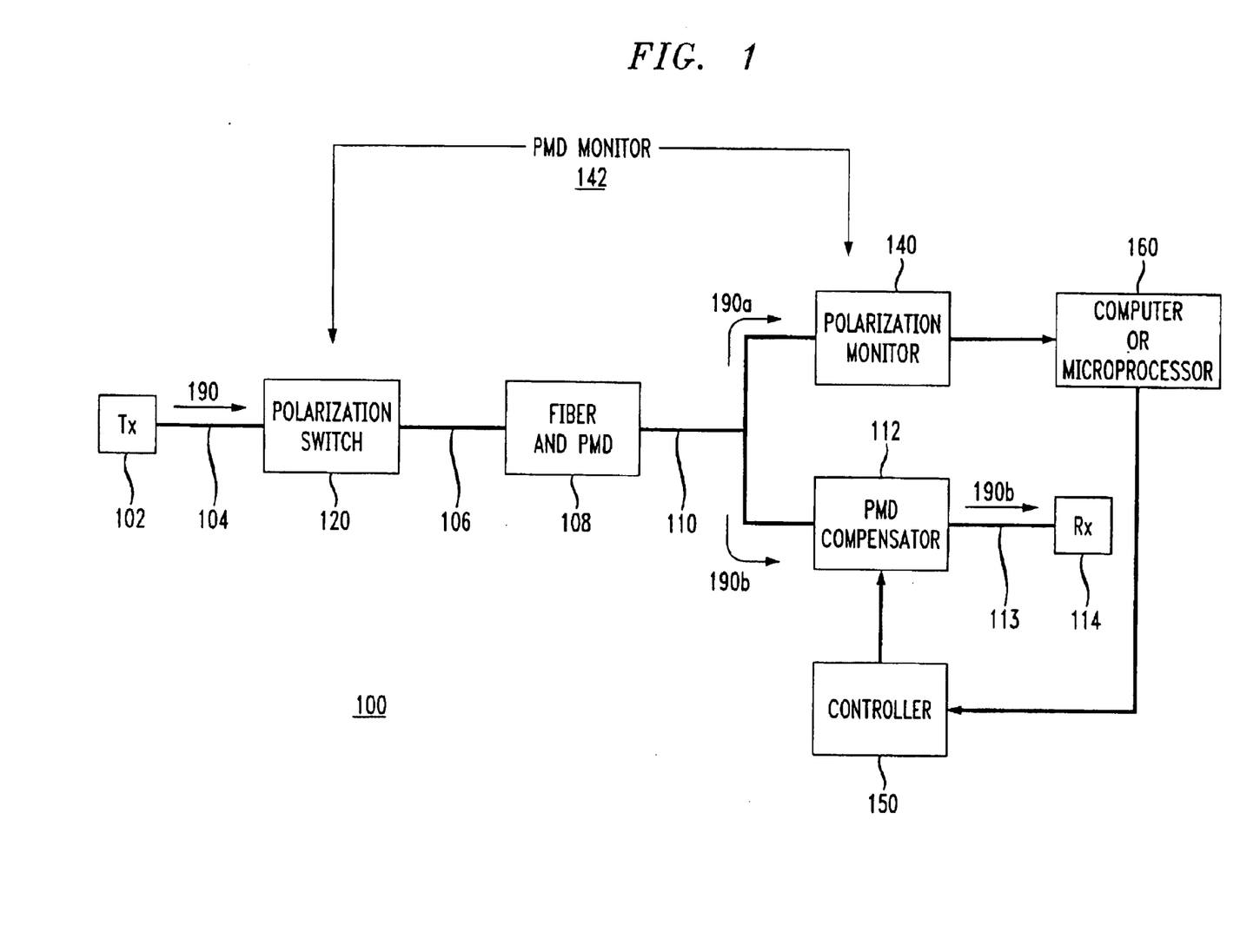
FIG. 1 depicts a schematic representation of a transmission system incorporating an on-line PMD monitor of the present invention.

FIG. 1 is a schematic diagram illustrating a transmission system 100 incorporating the present invention. According to the present invention, a polarization switch 120 and a polarization monitor 140 are used to provide real-time, on-line PMD monitoring concurrent with data transmission in the transmission system 100.

In FIG. 1, a transmitter (Tx) 102 corresponds to any suitable transmitting device, e.g., a laser diode capable of producing an optical signal 190, which acts as a data or transmission signal. The optical signal 190 from the transmitter 102 is usually characterized by a central wavelength, and is typically linearly polarized. The transmitter 102 is connected to a transmission medium, e.g., a single-mode polarization maintaining fiber (PMF) 104.

The output end of the fiber 104 is connected to a polarization switch 120, which is then connected to an input end 106 of a transmission fiber 108. For example, the polarization switch 203 may be a Pockels cell. Alternatively, other devices may also be used as the polarization switch 120 for rotating the polarization of the data signal 190. In the schematic representation of FIG. 1, it is assumed that the transmission fiber 108 represents the entire transmission line characterized by a polarization mode dispersion (PMD) to be monitored using embodiments of the present invention.

The output end 110 of the transmission fiber 108 is connected respectively to a polarization monitor 140 and a PMD compensator 112. As such, the transmission signal 190 is split into two portions—one portion 190a being coupled into the polarization monitor 140 of the present invention, and another portion 190b being coupled to the PMD compensator 112. The polarization monitor 140 is also connected to a computer or a microprocessor 160 that communicates with the polarization monitor 140 and a controller 150 for controlling the PMD compensator 112. The output 113 of the PMD compensator 112 is connected to a receiver 114 for receiving optical signals transmitted through the system 100. Typically, the polarization monitor 140 and the PMD compensator 112 are located in close proximity to the receiver (Rx) 114 to allow accurate PMD compensation for the data signal 190b arriving at the receiver 114. In an alternative embodiment, the polarization monitor 140 may be connected to the output 113 of the PMD compensator 112—e.g., the output 113 may be split into two portions (not shown in FIG. 1), with one portion directed to the polarization monitor 140, and another portion to the receiver 114. In general, embodiments of the polarization monitor 140 of the present invention can be used in conjunction with any PMD compensator 112.

The polarization switch 120 and the polarization monitor 140, which collectively form a PMD monitor 142, are used to provide real-time, on-line PMD measurements for the transmission fiber 108. Since the signal source used for PMD measurement is provided by the transmission or data signal 190 (as opposed to an external signal source), embodiments of the invention allow PMD measurements to be performed concurrent with data transmission in the transmission system 100.

Results of these measurements are provided as input data to the computer or microprocessor 160, which then computes relevant parameters for the adjustment of the PMD compensator 112. Alternatively, based on results of the PMD measurements, PMD compensation parameters may also be retrieved from a look-up table that may be stored in the computer 160. These parameters are communicated to the controller 150 which then adjusts the PMD compensator 112, such that the optical signal 190b arriving at the receiver 114 is compensated for any pulse distortion due to PMD (including higher orders) in the transmission system 100.

Polarization Monitor

Figure 2:
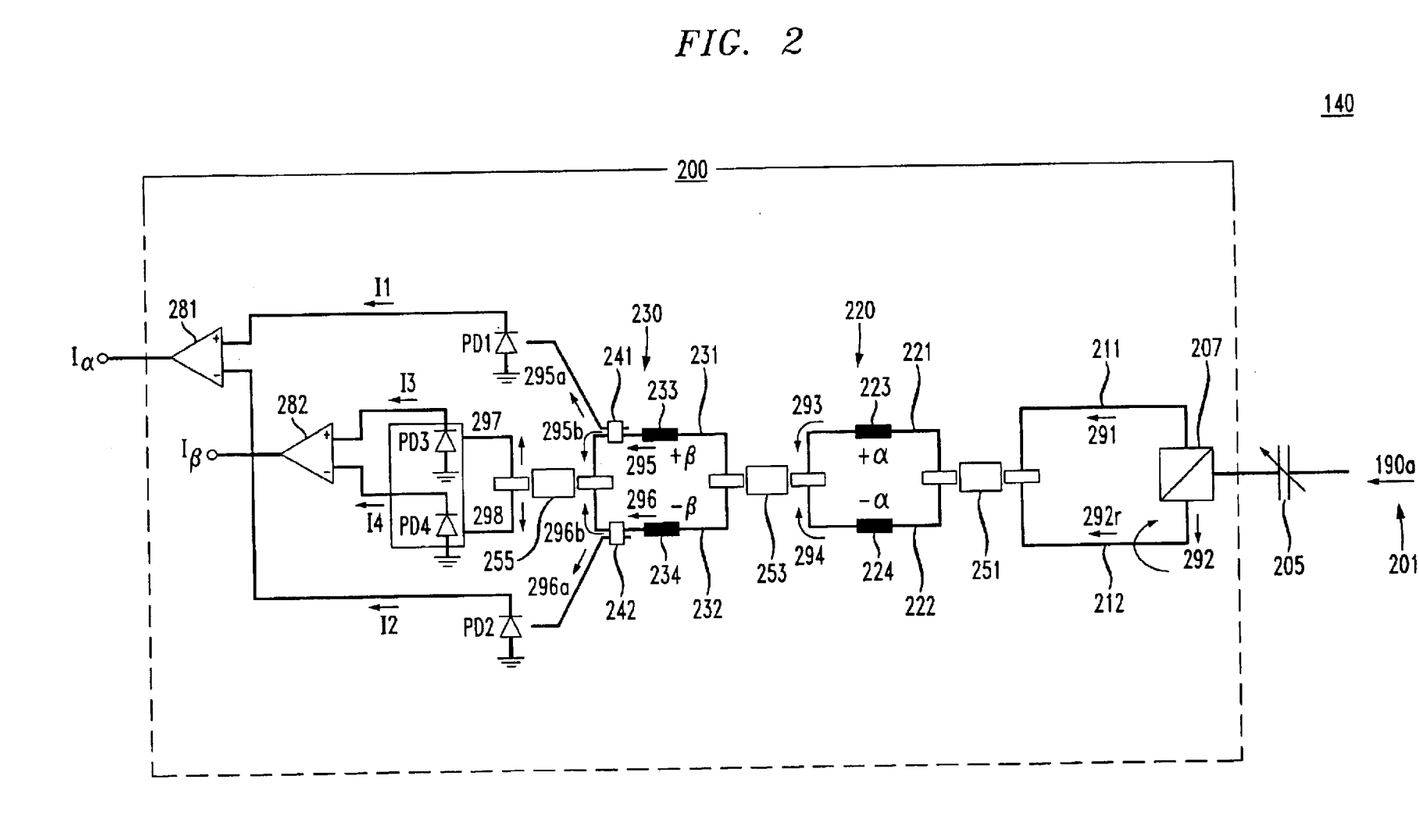
FIG. 2 depicts a schematic diagram for a polarization monitor setup.

FIG. 2 illustrates schematically the polarization monitor 140 according to one embodiment of the present invention. The polarization monitor 140 comprises an input 201 for receiving an incoming signal, e.g., the portion 190a of the data signal 190 of FIG. 1. Disposed towards the input 201 is an optical bandpass filter 205, e.g., a narrow bandwidth filter. The narrow bandwidth filter 205 allows selective transmission of a narrow range of signal frequency to the polarimeter 200, which constitutes the remainder of the polarization monitor 140. In general, different types of polarimeters may be used as a part of the PMD monitor 142 for practicing the present invention. The polarimeter 200 shown in FIG. 2 serves as one illustrative example.

In one embodiment, the narrow bandwidth filter 205 is a scanning Fabry-Perot filter (FPF). The FPF has a free spectral range that is sufficiently large such that only one transmission peak of the power function of the FPF is lying within the bandwidth of the data signal spectrum. The transmission peak of the FPF is also characterized by a central frequency that is denoted by $\omega_D$. Alternatively, other suitable narrow bandwidth filters, such as a grating device, may also be used. Typically, the bandwidth requirement of the optical bandpass filter 205 depends on the data rate of the transmission signal 190, the resolution required to accurately measure the polarization parameters and the maximum amount of differential group delay. The bandwidth of the optical bandpass filter 205 is typically a fraction of the data signal bandwidth.

The narrow bandwidth filter 205 allows a selected spectral component of the portion 190a of the transmission signal 190 to enter the polarimeter 200, which is used to measure the polarization of the data signal 190 by, e.g., determining the Stokes parameters.

In general, measurement of the Stokes parameters can be accomplished in different manners using a variety of polarimeters known in the art. The embodiment of the polarimeter 200 shown in FIG. 2 is meant to be illustrative, and other alternative polarimeter arrangements are also acceptable. For example, the polarimeter 200 of FIG. 2 comprises a polarization beam splitter (PBS) 207, which is connected to the narrow bandwidth filter 205. The polarimeter 200 further comprises a series of optical components including, for example, couplers, phase shifters, photodiodes and balanced receivers. Couplers (251, 253, 255) and phase shifters (223, 224, 233, 234) are arranged to form two Mach-Zehnder filters (MZF) 220 and 230 in a 2×2 filter chain arrangement. Optical outputs from these MZFs 220 and 230 are used to generate four photo-currents (I1, I2, I3, I4) which act as inputs to two balanced receivers 281 and 282.

The signal 190a is split into two components 291 and 292 by the polarization beam splitter 207. These signal components 291 and 292 have orthogonal polarization states with respect to each other, e.g., transverse electric (TE) and transverse electromagnetic (TM) modes, and propagate along two fibers 211 and 212. The polarization of the signal component 292 is then rotated by 90 degrees such that its polarization becomes parallel to that of the other signal component 291 (e.g., if component 291 is TE mode, then component 292 is also TE after the rotation). This rotation of the polarization may be accomplished, for example, by a physical twisting or rotation of the fiber 212. Note that in this illustrated setup of FIG. 2, either one of the signal components 291 and 292 may be rotated to achieve parallel polarization states for both components—e.g., 292 may be maintained in the TM mode, while 291 is rotated by the fiber 211 to produce the TM mode. In this embodiment of the 2×2 Mach-Zehnder filter chain, parallel polarization is required for the two optical inputs to the Mach-Zehnder filter 220. In alternative polarimeter setups, parallel polarization may not be required. In addition, instead of Mach-Zehnder filters 220 and 230, other alternative filters based on waveguide structures may also be used to introduce phase shifts to the optical signal components 291 and 292, which are required for polarization analysis.

The two optical signal components—e.g., the unrotated 291 and the rotated 292r, are coupled respectively into two arms 221 and 222 of the first MZF 220. In this embodiment, the MZF 220 is made up of two 3 dB couplers 251, 253 and two phase shifter 223, 224. A positive phase shift +α is introduced into the signal component 291 by the phase shifter 223 in one arm 221 of the first MZF 220, while a negative phase shift −α is introduced into the signal component 292r by the phase shifter 224 in the other arm 222 of the first MZF 220. The two phase-shifted signal outputs 293 and 294 from the first MZF 220 are then coupled into the second MZF 230, which comprises the 3 dB couplers 253, 255 and two phase shifters 233 and 234. Similar to the first MZF 220, one signal component 293 is phase-shifted by a positive amount, +β, by propagating through one arm 231 of the second MZF 230, while the other signal component 294 traveling through the other arm 232 of the second MZF 230 is phase-shifted by −β. Note that in this illustration, both Mach-Zehnder filters 220 and 230 are shown as comprising two phase shifters (223, 224 and 233, 234). However, it is also possible to use only one phase shifter—e.g., in filter structures such as those based on waveguides with tunable phase characteristics. The important feature is that a relative phase shift be introduced between the two respective arms of the filter structure.

The two phase-shifted output signals 295 and 296 from the second MZF 230 are then split respectively to produce signal components 295a, 295b, 296a and 296b by passing through two couplers 241 and 242. In one illustration, the couplers 241 and 242 are both 3 dB couplers, and are used as a splitter to split an input signal into two equal output components. Thus, a total of four optical output signals (295a, 295b, 296a, 296b) are obtained from the signal components 291 and 292r after propagating through the first and second MZF 220 and 230. Alternatively, the couplers 241 and 242 do not have to be 3 dB couplers. Instead, they may be used to provide unequal splitting in the output signals—e.g., by using 70/30 or 60/40 couplers. Regardless of the type of couplers used, it is important that the couplers 241 and 242 provide the same splitting ratios such that their optical outputs are provided as "matched" pairs. For example, if the optical output signals 295a and 295b are split in a ratio of 60:40, then the optical output signals 296a and 296b should also be in a ratio of 60:40. These matched pairs of outputs will be converted to corresponding current inputs to two balanced receivers 281 and 282.

The first optical output signal 295a is then directed into a first photo-detector PD1 to generate a first photocurrent I1, which acts as a first input to the balanced receiver 281. The second optical output signal 296a is directed into a second photo-detector PD2 to generate a photo-current output I2, which acts as a second input to the balanced receiver 281. If the photocurrents I1 and I2 are equal, the balanced receiver 281 will produce a zero current output.

The third optical output signal 295b is combined with the fourth optical output signal 296b via a 3 dB coupler 255 to form two optical outputs 297 and 298. These optical outputs 297 and 298 are converted into two photocurrent outputs I3 and I4 by two photo-detectors PD3 and PD4. These photo-current outputs I3 and I4 provide two separate inputs into the balanced receiver 282. When photo-currents I3 and I4 are equal, the balanced receiver 282 will give a zero current output.

Method of PMD Monitoring

Figure 3A:
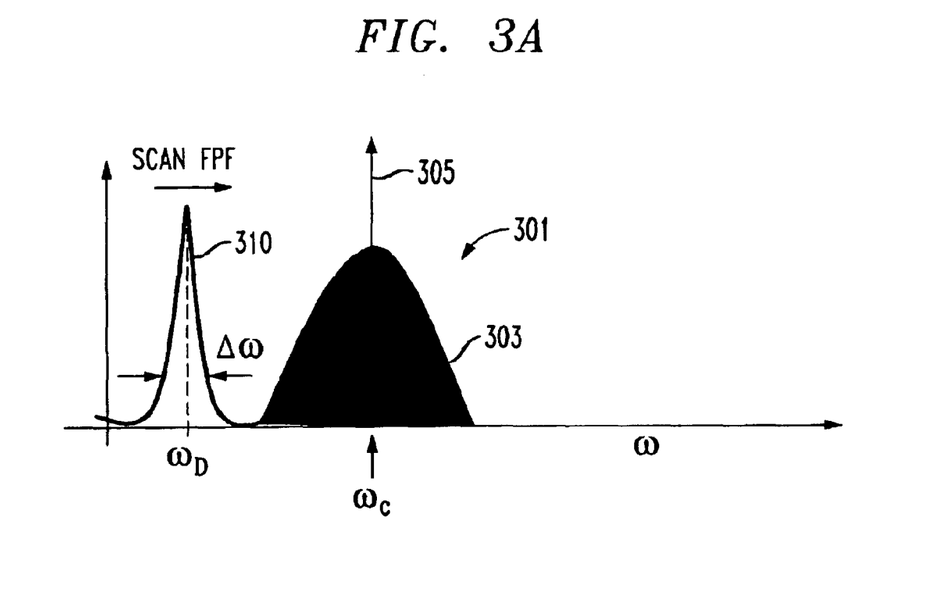
FIGS. 3A and 3B depicts graphical representations useful in understanding the present invention.

The PMD of the fiber 108 of FIG. 1 is measured with the polarization monitor 140 illustrated in FIG. 2. To determine the PMD in the transmission fiber 108, at least two series of measurements are performed with the data signal 190 set at least two different polarization states (by the polarization switch 120) that are non-orthogonal to each other. In one embodiment, two series of measurements are performed by scanning the transmission peak 310 of the narrow bandwidth filter 205 through a spectrum 301 of the data signal 190 (see FIG. 3), and adjusting the phase shifts α and β to produce zero outputs at both balanced receivers 281 and 282.

FIG. 3a illustrates the scanning operation of the Fabry-Perot filter 205, with the data signal 190 set at a first polarization state P1. The transmission peak 310 of the Fabry-Perot filter 205 (characterized by a bandwidth $\Delta\omega_D$ and a peak frequency $\omega_D$,) is scanned in one direction—e.g., increasing frequency ω, through the data signal 190, which is characterized by a spectrum 301. The spectrum 301 of the data signal 190 is schematically represented as comprising an envelop 303 and a carrier signal 305 at a frequency $\omega_C$. The frequency $\omega_C$ of the carrier signal 305 also provides a convenient calibration peak for the Fabry-Perot filter 205. The envelop 303 represents the bandwidth of the data signal 190, and varies proportionally with the data transmission rate—i.e., the higher the transmission bit rate, the higher the bandwidth. Note that the free spectral range of the Fabry-Perot filter 205 is sufficiently large such that only one transmission peak 310 of the Fabry-Perot filter 205 lies within the data signal spectrum 301. As the Fabry-Perot filter 205 is scanned, selected spectral components (defined by the position and bandwidth of the FPF peak 310) of the data signal spectrum 301 are transmitted through the scanning filter 205. Typically, measurements can be performed in a relatively short time. As an example, for a system having a bit rate of about 100 Gb/s, a Fabry-Perot filter 205 having a free spectral range of about 200 GHz and a resolution on the order of about 1 GHz may be used for scanning through the transmission signal 190. With a scanning interval of about 100 GHz, the scan time is about 0.1 milliseconds. Thus, the method is well-suited for online monitoring purposes.

Figure 3B:
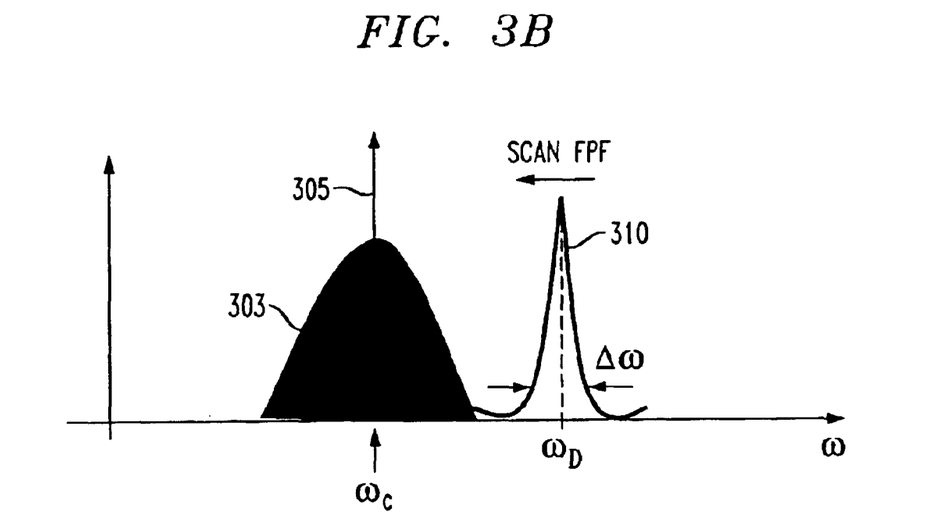

FIG. 3b illustrates the second series of measurements, in which the Fabry-Perot filter 205 is scanned in the opposite direction (e.g., decreasing frequency ω) through the spectrum 301 of the data signal 190. During these measurements, the data signal 190 is set, using the polarization switch 203 of FIG. 2, at a second polarization state P2 that is different and non-orthogonal to the first polarization state P1—e.g., rotated at 45 degrees from P1. Since conventional receivers are polarization insensitive, data transmission is not affected by this change in polarization of the data signal 190 by the polarization switch 203. Analysis of the results of the two series of measurements provide polarization parameters that can be used to determine the polarization mode dispersion in the fiber 108.

Figure 4:
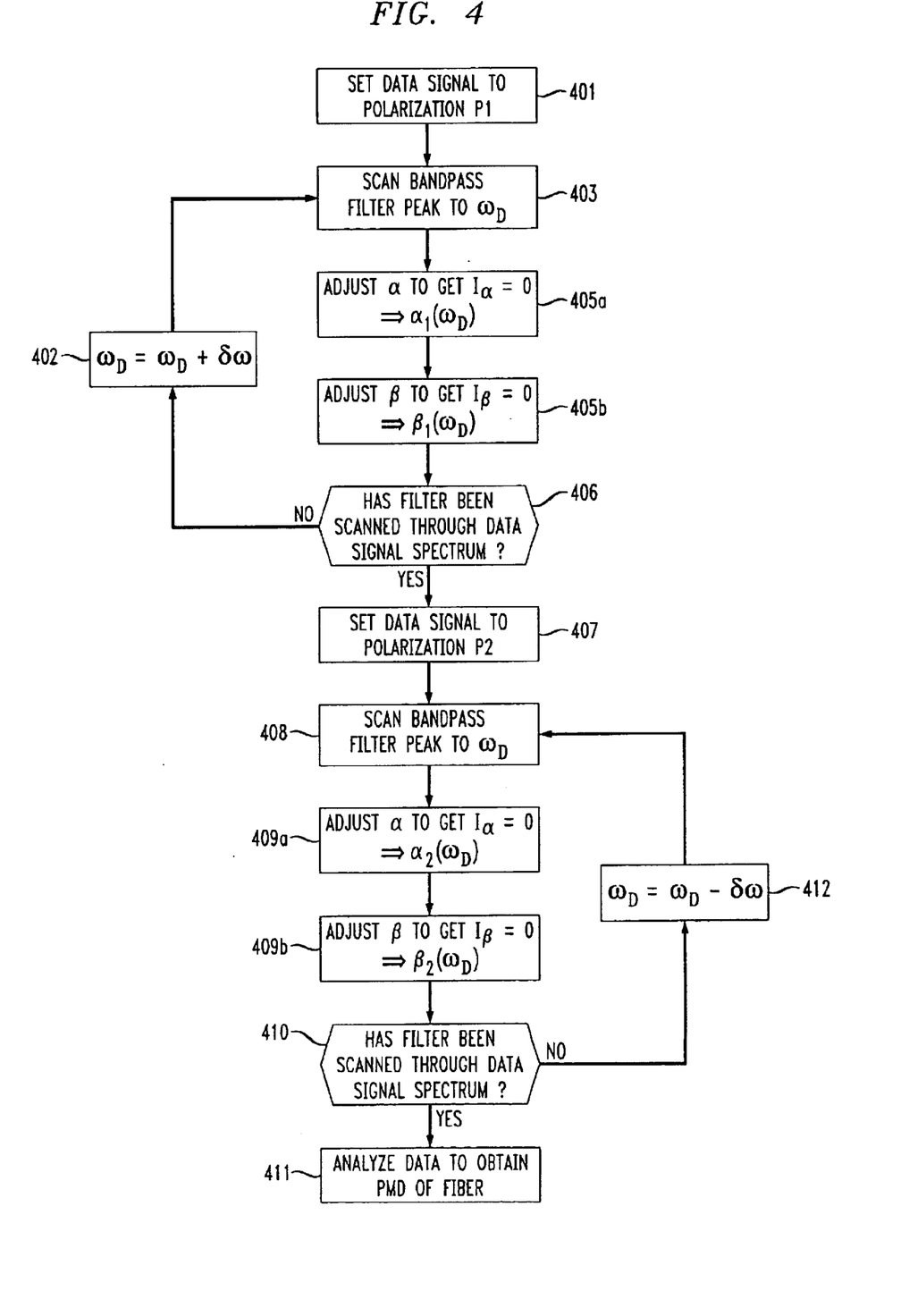
FIG. 4 depicts a flow diagram illustrating operation according to one embodiment of the invention.

FIG. 4 is a flow diagram depicting operation of the PMD monitor 142. In step 401, the data signal 190 is allowed to propagate through the transmission fiber 108 at a polarization state P1. For example, this polarization state P1 may be set by the polarization switch 203. Although a linearly polarized state P1 is used as an illustrative example in this discussion, other polarization states can also be used. With the portion 190a of the data signal 190 entering the polarization monitor 140, measurements of the polarization of the data signal 190 are performed in subsequent method steps shown in FIG. 4. In step 403, the Fabry-Perot filter (FPF) 205 is scanned through the spectrum 301 of the data signal 190, as previously discussed in FIG. 3a. As the FPF 205 is scanned, i.e., changing the central frequency $\omega_D$ of the FPF transmission peak 305, the phase shift α of the first Mach-Zehnder filter 220 is adjusted, in step 405a, so that the output current $I_\alpha$ at the first balanced receiver 281 remains zero. This is accomplished by a feedback loop between the balanced receiver 281 and the Mach-Zehnder filter 220. This method step 405a thus generates a phase shift $\alpha_1(\omega_D)$ corresponding to a frequency $\omega_D$ in the data signal 190.

In step 405b, with the phase shift $\alpha(\omega_D)$ set to yield a zero output current $I_\alpha$, the phase shift β of the second Mach-Zehnder filter 230 is adjusted so that the output current $I_\beta$ of the second balanced receiver 282 is also zero. Thus, a phase shift $\beta_1(\omega_D)$ is obtained corresponding to a frequency $\omega_D$ in the data signal 190. In step 406, a query is made as to whether the Fabry-Perot filter 205 has been scanned completely through the spectrum 301 of the data signal 190. If not, steps 403, 405a and 405b are repeated to generate phase shifts $\alpha_1(\omega_D)$ and $\beta_1(\omega_D)$ corresponding to a new peak frequency $\omega_D$ of the scanning Fabry-Perot filter 205. The new peak frequency $\omega_D$ differs from the old peak frequency by an amount $\delta\omega$, as shown in step 402. When the Fabry-Perot filter 205 is scanned completely through the spectrum 301 of the data signal 190, a series of $\alpha_1(\omega_D)$ and $\beta_1(\omega^D)$ will be obtained, corresponding to different spectral components at frequencies $\omega_D$ within the spectrum 301 of the data signal 190. The measurement sequence involving steps 403, 405a and 405b is then stopped, and the operation proceeds to step 407.

In step 407, the polarization switch 120 is set such that the data signal 190 has a polarization state P2 that is different and non-orthogonal to the polarization state P1. In general, P2 can be any polarization as long as it is not orthogonal to P1. In one embodiment, for example, P2 is linearly polarized, and is rotated at 45° with respect to P1. A new series of measurements is then performed in steps 408, 409a and 409b using procedures similar to those previously described for steps 403, 405a and 405b. Preferably, in step 408, the Fabry-Perot filter 205 is scanned in a direction opposite to that used in step 403. As the Fabry-Perot filter 205 is scanned in step 408, the phase shift $\alpha$ is adjusted to produce a zero $I_\alpha$ in step 409a. This gives a phase shift $\alpha_2(\omega_D)$ at a corresponding frequency $\omega_D$ of the Fabry-Perot filter 205. In step 409b, with the phase shift $\alpha$ set to yield a zero output current $I_\alpha$, the phase shift $\beta$ is adjusted to produce a zero output current $I_\beta$. Thus, $\beta_2(\omega_D)$ is obtained at the corresponding frequency $\omega_D$ of the Fabry-Perot filter 205.

A query is made in step 410 as to whether the Fabry-Perot filter 205 has been scanned completely through the spectrum 301 of the data signal 190. If not, steps 408, 409a and 409b are repeated to generate new phase shifts $\alpha_2(\omega_D)$ and $\beta_2(\omega_D)$ corresponding to a new peak frequency $\omega_D$ of the scanning Fabry-Perot filter 205. The new peak frequency $\omega_D$ differs from the old peak frequency by an amount $-\delta\omega$, as shown in step 412. When the Fabry-Perot filter 205 has been scanned completely through the data signal spectrum 301, the operation proceeds to step 411.

It should be noted that when there is negligible polarization dependent loss in the transmission system, then measurements at two non-orthogonal polarization states, P1 and P2,—i.e., operation of the PMD monitor as illustrated in FIG. 4, are sufficient to allow the determination of the PMD in the transmission fiber 108. However, if there is significant polarization dependent loss in the transmission system, then measurements have to be performed using at least three non-orthogonal polarization states of the data signal 190. Thus, in general, to determine the PMD in the transmission fiber 108, measurements have to be made by launching at least two non-orthogonal polarization states of the data signal 190 in the transmission fiber 108.

Finally, in step 411, analysis of the data acquired in measurement steps 401 through 409b is performed to obtain the polarization, and thus, the PMD of the transmission fiber 108. Various analytical approaches may be used to determine the PMD. In one illustration, the analysis is performed by determining the Jones matrix of the fiber 108.

Determination of the Jones Matrix

The Jones matrix analysis of the data obtained according to the method steps of FIG. 4 is explained as follows.

The Jones matrix describes the relationship between the input polarization state and the output polarization state of light in a fiber. In the case of a lossless medium, it is represented by a 2×2 unitary matrix:

$$\underline{U}(\omega) = \begin{bmatrix} u_1(\omega) & u_2(\omega) \\ -u_2^*(\omega) & u_1^*(\omega) \end{bmatrix}$$

where $\omega$ is the frequency of the optical signal being propagated in the fiber, $u_1$ and $u_2$ are elements in the Jones matrix, while $u_1^*$, $u_2^*$ are their respective complex conjugates.

Operation of the PMD monitor according to the steps in FIG. 4 results in two series of measurements for the phase shifts $\alpha$ and $\beta$—i.e., $\alpha_1(\omega_D)$, $\beta_1(\omega_D)$ and $\alpha_2(\omega_D)$, $\beta_2(\omega_D)$ for corresponding values of $\omega_D$ within the data signal spectrum 301. For linearly polarized inputs P1 and P2 that are set at 45° with respect to each other, it can be shown that the Jones matrix of the fiber is related to the phase shifts $\alpha$ and $\beta$ by the following equations:

$$\underline{U}(\omega_D) = \begin{bmatrix} u_1(\omega) & u_2(\omega) \\ -u_2^*(\omega) & u_1^*(\omega) \end{bmatrix}_{\omega=\omega_D} \quad \text{Eq. (1)}$$

$$= \begin{bmatrix} -j\sin(\alpha_1(\omega)) & j\cos(\alpha_1(\omega)) \\ j\cos(\alpha_1(\omega)) & j\sin(\alpha_1(\omega)) \end{bmatrix}_{\omega=\omega_D}$$

$$\begin{bmatrix} e^{-j\beta_1(\omega)} & 0 \\ 0 & e^{+j\beta_1(\omega)} \end{bmatrix}_{\omega=\omega_D} \begin{bmatrix} \frac{q}{\sqrt{2}} & -\frac{q^{-1}}{\sqrt{2}} \\ \frac{q}{\sqrt{2}} & \frac{q^{-1}}{\sqrt{2}} \end{bmatrix}_{\omega=\omega_D}$$

where $q(\omega)=\{j\cos[2(\alpha_2-\alpha_1)]\sin(2\beta_1)\cos(2\beta_2)-j\sin(2\beta_2)\cos(2\beta_2)-\sin[2(\alpha_2-\alpha_1)]\cos(2\beta_2)\}^{1/2}$ Note that for simplicity, $\alpha_1(\omega)$, $\beta_1(\omega)$, $\alpha_2(\omega)$ and $\beta_2(\omega)$ have been abbreviated as $\alpha_1$, $\beta_1$, $\alpha_2$ and $\beta_2$ in the equation for $q(\omega)$.

By solving Eq. (1), elements of the Jones matrix can be obtained, and PMD of the fiber 108 can be determined. The data analysis may be performed using the computer or microprocessor 160 of FIG. 1, and appropriate parameters for the controller 150 may be obtained, for example, by the use of a look-up table.

Figure 5:
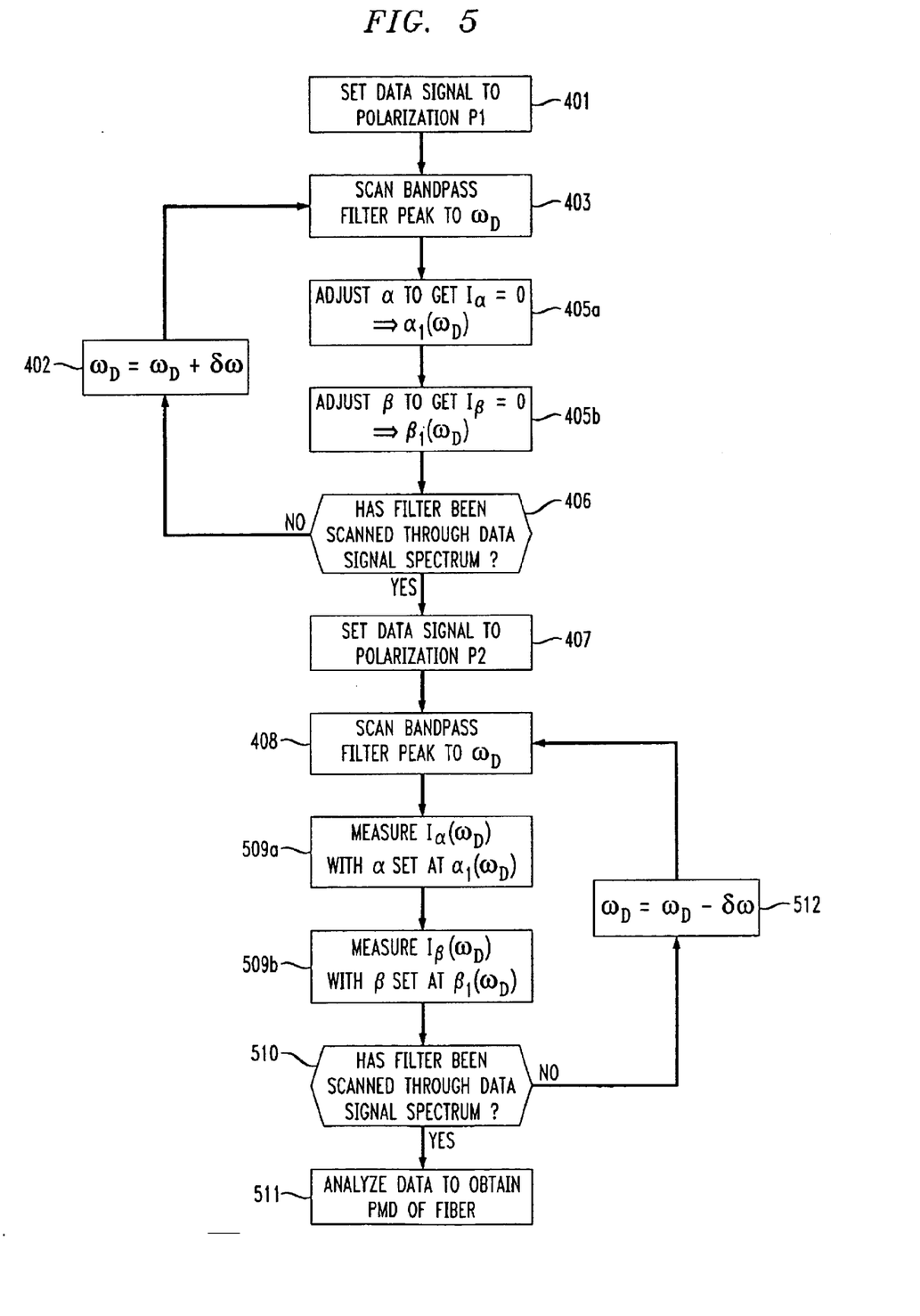
FIG. 5 depicts a flow diagram illustrating an alternative operation according to one embodiment of the invention.

In yet another embodiment, a different operation sequence may be used for the measurements of the PMD, as illustrated in FIG. 5. Steps 401 through 406 are performed as previously described in connection with FIG. 4, resulting in a series of measurements for $\alpha_1(\omega_D)$ and $\beta_1(\omega_D)$. In step 407, the data signal 190 is again set to a polarization P2, that is different and non-orthogonal to P1. In this illustrative embodiment, P2 is linearly polarized and set at 45° with respect to P1. The subsequent measurement sequence, however, is altered from that of FIG. 4. In particular, during the scanning operation of 408, the phase shift $\alpha$ is set according to the $\alpha_1(\omega_D)$ value previously generated in step 405a, and the value of the output current $I_\alpha$ is measured at the corresponding value of $\omega_D$. This is illustrated in step 509a. In step 509b, the phase shift $\beta$ is set according to the $\beta_1(\omega_D)$ value generated previously in step 405b, and the value of the output current $I_\beta$ is measured at the corresponding value of $\omega_D$. Preferably, in step 408, the Fabry-Perot filter 205 is scanned in a direction opposite to that used in step 403.

In step 510, a query is made as to whether the Fabry-Perot filter 205 has been scanned completely through the data signal spectrum 301. If not, steps 408, 509a and 509b are repeated to generate new values of $I_\alpha(\omega_D)$ and $I_\beta(\omega_D)$ corresponding to a new peak frequency $\omega_D$ of the Fabry-Perot filter 205. As shown in step 512, the new peak frequency $\omega_D$ differs from the old peak frequency by an amount $-\delta\omega$. When the Fabry-Perot filter 205 is scanned completely through the data signal spectrum 301, the operation proceeds to step 511 for data analysis. Analysis of the results $\alpha_1(\omega_D)$, $\beta^1(\omega_D)$, $I_\alpha(\omega_D)$ and $I_\beta(\omega_D)$ can be performed using techniques known to those skilled in the art, allowing the determination of the PMD in the fiber 108.

Again, when the polarization dependent loss in a transmission system is negligible, operation of the PMD monitor 142 with measurements at two non-orthogonal polarization states P1 and P2 of the data signal 190 is sufficient for determining the PMD of the transmission fiber 108. While measurements can be performed at more than two polarization states, it is not necessary. However, if the polarization dependent loss in the transmission system is not negligible, then additional measurements have to be performed with the data signal set at least a third polarization state, in order to determine the PMD in the transmission fiber 108. The operation sequences shown in FIG. 4 and FIG. 5 are meant for illustrative purposes, and other variations can be used for determining the fiber PMD according to the present invention.

In general, the polarization monitor 140 of FIG. 2 can be implemented using a variety of technologies. For example, depending on specific system requirements, the polarization monitor 140 may be fabricated using indium phosphide, lithium niobate or silicon optical bench devices. The PMD monitor of the present invention provides certain advantages over existing PMD measurement techniques. For example, since PMD measurements are performed by using a portion of the data signal, real-time PMD monitoring are achieved without interruption in data transmission. A complete determination of the fiber Jones matrix, for example, allows higher orders PMD to be calculated. With the measurement device located in close proximity to the receiver, PMD compensations can be achieved with increased accuracy and reliability.

Although preferred embodiments which incorporate the teachings of the present invention have been shown and described in detail, those skilled in the art can readily devise many other varied embodiments that still incorporate these teachings.

What is claimed is:

1. A method for monitoring a polarization mode dispersion in a transmission fiber of a transmission system, comprising steps of:
   (a) propagating an information bearing data signal through the transmission fiber; and
   (b) measuring the polarization mode dispersion in the transmission fiber concurrent with the step (a).

2. The method of claim 1, wherein the measuring step (b) is performed by directing a first portion of the data signal into a polarization monitor while allowing a second portion of the data signal to reach a receiver of the transmission system.

3. The method of claim 2, wherein the data signal is propagated through a polarization switch prior to performing step (a).

4. The method of claim 3, wherein the polarization monitor comprises a narrow bandwidth optical filter and a polarimeter.

5. The method of claim 4, wherein the measuring step (b) comprises selecting a spectral component of the first portion of the data signal using the narrow bandwidth optical filter, and directing the selected spectral component of the first portion of the data signal into the polarimeter for measuring polarization parameters corresponding to the selected spectral component of the first portion of the data signal.

6. The method of claim 5, wherein the measuring step (b) further comprises measuring polarization parameters for the selected spectral component of the first portion of the data signal with the data signal set at two or more polarization states using the polarization switch.

7. The method of claim 3, wherein the measuring step (b) comprises the steps of:
   (b1) forming a first signal component and a second signal component from at least a portion of the data signal;
   (b2) propagating the first and second signal components through at least two phase shifters to generate a first plurality of phase-shifted signal components for a first polarization state of the optical signal;
   (b3) propagating the first and second signal components through the at least two phase shifters to generate a second plurality of phase-shifted signal components for a second polarization state of the optical signal; wherein the second polarization state is different and non-orthogonal to the first polarization state;
   (b4) analyzing the first and second plurality of phase-shifted signal components to determine the polarization mode dispersion in the transmission fiber.

8. A method for on-line polarization mode dispersion monitoring of a transmission fiber, comprising steps of:
   (a) providing an information bearing data signal characterized by a spectrum and a polarization state, wherein the polarization state of the data signal can be varied using a polarization switch;
   (b) propagating the data signal of step (a) through the transmission fiber showing a polarization mode dispersion;
   (c) after step (b), directing a portion of the data signal through an optical bandpass filter into a polarimeter;
   (d) obtaining a first set of polarized signals using the polarimeter by scanning the optical bandpass filter through the spectrum of the data signal, with the data signal set at a first polarization state by the polarization switch;
   (e) obtaining a second set of polarized signal using the polarimeter by scanning the optical bandpass filter through the spectrum of the data signal, with the data signal set at a second polarization state that is different and non-orthogonal to the first polarization state; and
   (f) computing the polarization mode dispersion in the transmission fiber by analyzing at least the first and second sets of polarized signals.

9. The method of claim 8, further comprising:
   (g) prior to performing step (f), obtaining at least a third set of polarized signals using the polarimeter by scanning the optical bandpass filter through the spectrum of the data signal, with the data signal set to at least a third polarization state that is different and non-orthogonal to the first and second polarization state using the polarization switch; and wherein step (f) further comprises analyzing the at least third set of polarized signals.

10. An apparatus for polarization mode dispersion monitoring of a transmission fiber, comprising:
   a polarization switch connected to an input of the transmission fiber characterized by the polarization mode dispersion;
   an optical bandpass filter connected to an output of the transmission fiber; and a polarimeter connected to the optical bandpass filter, said polarimeter measuring the polarization mode dispersion of said optical fiber concurrently with the propagation of an information bearing data signal though said optical fiber.

11. The apparatus of claim 10, wherein the optical bandpass filter is a scanning Fabry-Perot filter.

12. The apparatus of claim 10, wherein the polarization switch is a Pockels cell.

13. The apparatus of claim 10, wherein the polarimeter comprises:

an optical signal converter for converting a data signal in the transmission fiber into two optical signal components;

a first phase shifter coupled to the optical signal converter for generating a first phase shift in the two optical signal components;

a second phase shifter coupled to an output of the first phase shifter for generating a second phase shift in two optical signal components propagating through the second phase shifter;

four photo-detectors coupled to the second phase shifter for generating photo-currents;

a first balanced receiver having two inputs coupled respectively to two of the four photo-detectors; and a second balanced receiver having two inputs coupled respectively to the other two of the four photo-detectors.

14. The apparatus of claim 13, wherein the first and second phase shifters are Mach-Zehnder devices.

15. The apparatus of claim 13, wherein the optical signal converter comprises:

a polarization beam splitter for converting one input signal into two optical output signals having polarization states that are orthogonal to each other;

two fibers coupled respectively to the polarization beam splitter for transmitting the two optical output signals; and at least one of the two fibers is rotatable to change the polarization state of one of the two optical output signals to be parallel to that of the other optical output signal.

16. The apparatus of claim 15, wherein the polarization beam splitter is coupled to the first phase shifter by a first 3 dB coupler, the first phase shifter is coupled to the second phase shifter by a second 3 dB coupler, and the second phase shifter is coupled to the four photo-detectors respectively by a third, fourth and fifth 3 dB coupler.

17. An apparatus for measuring polarization mode dispersion in a transmission fiber of a transmission fiber, comprising:

a polarization switch connected to an input of the transmission fiber characterized by the polarization mode dispersion;

an optical bandpass filter connected to an output of the transmission fiber; and a polarimeter connected to the optical bandpass filter; wherein the polarimeter comprises:

an optical signal converter for converting a data signal in the transmission fiber into two optical signal components;

a first phase shifter coupled to the optical signal converter for generating a first phase shift in the two optical signal components;

a second phase shifter coupled to an output of the first phase shifter for generating a second phase shift in two optical signal components propagating through the second phase shifter;

four photo-detectors coupled to the second phase shifter for generating photo-currents;

a first balanced receiver having two inputs coupled respectively to two of the four photo-detectors; and a second balanced receiver having two inputs coupled respectively to the other two of the four photo-detectors.

* * * * *